(12) United States Patent
Ballantyne (10) Patent No.: US 6,990,669 B1
(45) Date of Patent: Jan. 24, 2006

(54) REAL-TIME SCHEDULER (75) Inventor: Joseph C. Ballantyne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/531,397

(22) Filed: Mar. 21, 2000

(51) Int. Cl.
G06F 9/46 (2006.01)

(52) U.S. Cl. .................. 718/108; 718/100; 718/102; 718/107

(58) Field of Classification Search ............... 709/100, 709/102, 104, 107–108
See application file for complete search history.

(56) References Cited

U.S. PATENT DOCUMENTS

| 5,437,047 | A | * | 7/1995 | Nakamura | 709/201 |
| 5,937,187 | A | * | 8/1999 | Kosche et al. | 709/104 |
| 5,961,585 | A | * | 10/1999 | Hamlin | 709/108 |
| 5,995,745 | A | | 11/1999 | Yodaiken | |
| 6,085,218 | A | * | 7/2000 | Carmon | 709/107 |
| 6,167,425 | A | * | 12/2000 | Beckhoff | 709/103 |
| 6,320,882 | B1 | * | 11/2001 | Patterson et al. | 370/522 |
| 6,330,583 | B1 | * | 12/2001 | Reiffin | 709/105 |
| 6,370,606 | B1 | * | 4/2002 | Bonola | 710/260 |
| 6,374,286 | B1 | * | 4/2002 | Gee et al. | 709/108 |
| 6,421,702 | B1 | * | 7/2002 | Gulick | 709/102 |
| 6,466,962 | B2 | * | 10/2002 | Bollella | 709/107 |
| 6,470,397 | B1 | | 10/2002 | Shah et al. | |
| 6,496,848 | B1 | * | 12/2002 | Nankaku | 709/100 |

OTHER PUBLICATIONS

*Emulating Soft Real-Time Scheduling Using Traditional Operating System Schedulers,* by Adelberg, et al., Proceedings Real-Time Systems Symposium 1994, pp. 292-298.

*Solving Hard Real-Time Scheduling Problems on a Single Processor,* by Ecker, Proceedings of the 4th International Workshop on Parallel and Distributed Real-Time Systems 1996, pp. 81-86.

*Proportional Share Scheduling of Operating System Services for Real-Time Applications,* by Jeffay, et al., Proceedings of the 19th IEEE Real-Time Systems Symposium, 1998, pp. 480-491.

*Soft Real Time Scheduling for General Purpose Client—Server Systems,* by Ingram, Proceedings of the Seventh Workshop on Hot Topics in Operating Systems 1999, pp. 130-135.

*Implementing a General Real-Time Scheduling Framework in the RED-Linux Real-Time Kernel,* by Wang and Lin, Proceedings of the 20th IEEE Real-Time Systems Symposium 1999, pp 246-248.

*A Sort Real-Time Scheduling Server on the Windows NT,* by Lin et al., Proceedings of the 2nd USENIX Windows NT Symposium, 1998, pp. 149-155.

*Win32 and Real Time,* by Peterson & Schotland, Circuit Cellar Ink, Apr. 1999, pp. 45-49.

*A Soft Real Time Scheduling Server in UNIX Operating System,* by Chu and Nahrstedt, Interactive Distributed Multimedia Systems and Telecommunications Services, 4th International Workshop, 1997, pp. 153-162.

* cited by examiner

*Primary Examiner*—Meng-Al T. An
*Assistant Examiner*—Syed J Ali
(74) *Attorney, Agent, or Firm*—Banner & Witcoff, Ltd.

(57) ABSTRACT

Methods and computer-executable components for real-time scheduling of CPU resources are disclosed. A performance counter determines when to allocate CPU resources to a thread. When it is time to allocate the CPU resources, the performance counter issues a non-maskable interrupt to an advanced programmable interrupt controller (APIC). The APIC then issues a non-maskable interrupt to the CPU. In response to receiving the non-maskable interrupt, the CPU allocates resources to the thread.

9 Claims, 5 Drawing Sheets

REAL-TIME SCHEDULER

FIELD OF THE INVENTION

The present invention relates to the field of computer operating systems and, in particular, to methods and computer-executable components for facilitating real-time scheduling of CPU resources.

BACKGROUND OF THE INVENTION

Microsoft Windows NT® and Windows® 95/98 do not currently support real-time scheduling of CPU resources. For example, with Windows NT®, all interrupts and deferred procedure calls must be completed before execution of a "real-time" priority NT thread. Even more problematic is the fact that third-party virtual device drivers can disable all interrupts in Windows® 95/98. Further, thread execution on these operating systems is scheduled based on the idea of a thread priority. Threads of equal priority split the CPU resources equally. There is no concept of allocating CPU resources to a thread on a periodic or single shot basis. In addition, there is no up front failure if the required CPU resources are not available because other clients have already reserved the needed CPU bandwidth. Consequently, even the highest priority threads can have their execution delayed for indeterminate periods of time in both operating systems.

The Windows NT® driver model allows execution in 3 different fundamental layers of the OS, at interrupt time, at DPC time, and at thread execution time. Interrupts are run before anything else. If there is an interrupt pending, and it can be serviced, then servicing it will happen before anything else. After all hardware interrupts are serviced, any pending deferred procedure calls (DPCs) are executed. These DPCs are run in a software interrupt. The DPCs can be interrupted by other interrupts that have a higher priority, but they will all be run before execution of the interrupted thread resumes. After all interrupts have been serviced, and all queued DPCs have been run, then the operating system resumes running a thread. All application level code is run in a thread. Most of the operating system code also runs in threads at a passive level.

Well-written Windows NT® drivers spend very little time in their interrupt service routine (ISR). NT device drivers are supposed to do most of their work in a DPC. Thus, well-written drivers do little more in their ISR besides touch their hardware to clear the interrupt, and queue up a DPC in which they will do most of their work. The vast majority of NT drivers are well behaved so interrupt latency on NT is very low, usually on the order of tens of nanoseconds to microseconds. A DPC can run on any processor and in any thread context. On a uni-processor system all DPCs must complete before the system will return to running the thread whose execution was interrupted. On a multiple processor machine, it is possible to have one processor running a thread while a different processor is servicing an interrupt, or running a DPC.

There are two primary obstacles to guaranteed, hard periodic scheduling of threads on Windows NT®. First, there is no API defined to specify to the operating system what periodicity and CPU resources a thread requires. Second, interrupts and DPCs hold off execution of all threads, and the length of time those interrupts and DPCs can run is unbounded.

On Microsoft Windows® 95 and 98 the situation is worse. There are a significant number of poorly-written third-party device drivers (i.e. VxDs) that disable all interrupts on the operating system. Sometimes, these device drivers will disable interrupts for extended periods of time. When interrupts are disabled nothing else in the system can run except the code that turned off interrupts. On Windows NT® it is considered unacceptable to turn off all interrupts. There are very few places in the Windows NT® kernel where all interrupts are turned off. However, on Windows® 95 and 98 originally, the only way to disable one interrupt was to disable them all. There was no concept in the operating systems of multiple interrupt request levels (IRQL). Interrupts were either enabled, or disabled, and the only priority relationships between interrupts were those imposed by the programmable interrupt controller (PIC) at the hardware level. In the software, all interrupts were treated equally. In fact, the kernel interrupt service code actually muddled the priority relationships between interrupts that were imposed at the hardware level. Since it made it possible for a lower priority interrupt at the hardware level to interrupt code that serviced hardware with an interrupt at a higher priority level if the interrupt service routine for the higher priority interrupt enabled interrupts.

This situation changed somewhat with Windows® 98 when the Windows Driver Model (WDM) support was added to the operating system. At least for WDM drivers, there was now the concept of IRQL and interrupt priority levels in the software. However, all of the legacy third-party device drivers continue to run the same way they previously operated. All of the legacy kernel system code still deals with interrupts as either ON or OFF. Consequently, even in Windows® 98, there is code all over the operating system and in third-party device drivers that disables interrupts.

In order to perform any real-time scheduling on Windows® 95/98, something must be done to solve the problem of how to get control from the existing code when interrupts are disabled. The assembly language instruction for turning off maskable interrupts is CLI. To re-enable interrupts the instruction is STI. Interrupts can also be enabled in ring 0 code by popping the EFLAGS register off of the stack. There are CLIs, STIs, and PUSHFD, POPFD instructions all through the Windows® 95/98 code base. Unless control of the CPU can be taken away from code that is running with interrupts disabled, there is no hope of enabling guaranteed-hard-real-time scheduling. Scheduled threads will not be allowed to run until after the STI instruction is executed.

Accordingly, it is an object of the present invention to provide improved methods and computer-executable components for facilitating real-time scheduling of CPU resources.

SUMMARY OF THE INVENTION

The present invention can be broadly summarized as follows. In one embodiment, a method facilitates real-time scheduling of CPU resources on a microprocessor. A counter (such as a performance counter, timer or other device) is used to determine when to allocate the CPU resources to a thread. When it is time to allocate the CPU resources, the counter generates an interrupt which is fed to an interrupt controller, such as an APIC. The interrupt controller then proceeds to instruct the CPU to allocate CPU resources to the thread. Preferably, the communications between the counter and the interrupt controller as well as between the interrupt controller and the CPU are in the form of non-maskable interrupts.

In another embodiment, the counter interrupt line could be directly connected to the CPU rather than going through the APIC first. The counter would in this example, issue a non-maskable interrupt directly to the CPU.

Of course, the methods of these embodiments may also include other additional components and/or steps.

Other embodiments are disclosed and claimed herein as well.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

The present invention provides methods and computer-executable components for facilitating real-time scheduling of CPU resources. In particular, this invention overcomes the problems of the prior art by preferably using a performance counter to count unhalted cycles or instructions executed on the CPU. After a determined number of cycles or instructions transpire, the performance counter issues a non-maskable interrupt (NMI) to a programmable interrupt controller (PIC), such as an APIC on an Intel x86 CPU or an OpenPIC on a Cyrix or AMD CPU. Issuance of the NMI triggers execution of the scheduler, and thus, switches thread execution on a real-time basis. Thus, this invention overcomes the problems of the prior art and provides real-time scheduling of CPU resources.

Before proceeding with a detailed discussion of this case, the following terms are defined in order to facilitate a better understanding of the present invention.

An "advanced programmable interrupt controller" (APIC) is interrupt handling hardware that can support symmetric multiprocessing (SMP) for Intel multiprocessor systems. In multiprocessor systems there are both local APICs that reside on each CPU, and an IO APIC that communicates with the local APICs on each CPU. All Intel processors from the Pentium MMX (P54C) on up have a local APIC. The Pentium II and newer processors can enable and disable the local APIC under software control. The Pentium MMX local APIC was enabled and disabled according to voltage levels sampled on certain pins of the processor when the processor came out of reset. That means the Pentium local APIC cannot be enabled if the system designer turned it off in hardware. Most Pentium systems disable the local APIC.

An "application program interface" (API) is a set of well defined function calls that can be made by one software module to another software module. In many cases this takes the form of an application program calling functions in the operating system or other system program such as a database management system (DBMS). APIs are implemented by writing functions in one software module in a fashion which enables calls to those functions from external modules to be linked to the module containing the function.

A "central processing unit" (CPU) as used herein is the computing portion of a processor or microprocessor. Examples of such processors are the Intel Pentium 4 GB, Pentium MMX 4 GB, Pentium Pro 64 GB, Pentium II 4 GB MMX, Celeron 4 GB MMX, Xeon PII 64 GB MMX, Pentium III 4 GB MMX KNI, or Xeon PIII 64 GB MMX KNI. Other suitable processors are also available from Digital Equipment Corporation, Advanced Micro Devices, and Cyrix Corporation.

A "counter" is a variable in programming, a hardware chip or a portion thereof, that is used to keep track of anything that must be counted.

A "driver," also called a "device driver," is a program routine that links a peripheral device to the operating system. A driver contains the precise machine language necessary to perform the functions requested by the application or the operating system.

A "global descriptor table" (GDT) is a table used by the operating system to identify the descriptors for shared data.

An "interrupt descriptor table" (IDT), or an "interrupt dispatch table" is a table used by the operating system to identify software interrupt handlers or interrupt service routines for each of the supported interrupts in the system. In the event that an interrupt is received or an interrupt instruction is executed by the CPU, the CPU will look up the appropriate address for the handler for that interrupt and then transfer control to that handler.

An "interrupt request line" (IRQ) is a hardware interrupt line or trace on a PC. AT compatible PCs support 16 hardware interrupts. One of these is used to support a cascaded interrupt controller, so there are 15 external interrupt sources that can be supported on the PC AT compatible system. Machines with APICs can support additional hardware interrupts up to 256 which is the maximum size of the x86 IDT. Most non PCI devices do not share interrupts. PCI devices can and many times do share interrupts.

An "interrupt service routine" (ISR) is a program routine executed in response to an interrupt. The IDT contains pointers to the entry points of the interrupt service routines.

An "interrupt" is a signal that gets the attention of the CPU and is usually generated when I/O is required. For example, hardware interrupts are generated when a key is pressed or when the mouse is moved. Disk drive's will generate interrupts when they have completed a read or write and are ready for the next command. When an interrupt occurs, control is transferred to the operating system, which determines the action to be taken. Interrupts are prioritized; the higher the priority, the faster the interrupt will be serviced.

A "machine cycle" is the shortest interval in which an elementary operation can take place within the processor. It is made up of some number of clock cycles.

A "maskable interrupt" is an interrupt line on the processor that can be masked or unmasked by software running on the processor. When an interrupt is masked, it is ignored by the processor until software unmasks it.

"Multitasking" is the running of two or more programs in one computer at the same time.

The number of programs that can be effectively multitasked depends on the type of multitasking performed (pre-emptive vs cooperative), CPU speed and memory and disk capacity.

"Multithreading" is multitasking within a single program. It allows multiple streams of execution to take place concurrently within the same program, each stream processing a different transaction or message.

A "non-maskable interrupt" (NMI) is an interrupt pin on the CPU that cannot be masked by software. When this type of interrupt pin is made active, the interrupt will be serviced. Software cannot mask or force the processor to ignore this interrupt. True non maskable interrupts do not exist on the PC platform today. There is a way to mask even "non-maskable interrupts"—but you must do additional work to that involved in masking maskable interrupts. Maskable interrupts can be disabled on an x86 processor by simply executing the CLI instruction. Maskable interrupts can be enabled on an x86 processor by executing the STI instruction. Executing a CLI instruction or clearing the IE bit of the EFLAGS register will NOT prevent a "non-maskable interrupt" from occurring. Normally a non maskable interrupt (NMI) is used to report malfunctions such as parity, bus and math coprocessor errors. In the present invention, an NMI is used to instruct the CPU to switch execution from one thread to another.

An "operating system" is the master control program that runs a computer. The operating system is loaded when the computer is turned on, and its core, called the kernel, is at least partly resident in memory at all times. Operating systems, as the term is used herein, includes but is not limited to: Microsoft Windows® 95 and 98, Microsoft Windows NT®, UNIX, Linux and Macintosh System 7.

An "OPEN programmable interrupt controller" (OpenPIC) is an SMP chip architecture endorsed by AMD and Cyrix Corporation that provides symmetric multiprocessing (SMP) for x86 and PowerPC systems.

A "programmable interrupt controller" is an Intel 8259A chip that controls interrupts or any other chip capable of controlling interrupts. Starting with the 286-based AT, there are two PICs in a PC, providing a total of 15 usable IRQs. The PIC has been superseded by Advanced Programmable Interrupt Controllers or APICs, which are enhanced for multiprocessing.

A "scheduler" is a part of the kernel or a device driver in an operating system that initiates and terminates jobs (programs) in the computer. In addition, a scheduler maintains a list of jobs to be run and allocates computer resources as required.

A "scheduling algorithm" is a method used to schedule jobs for execution. Priority, length of time in the job queue, least recently used, and available resources are examples of criteria that can be used in a scheduling algorithm.

A "thread" is the state that must be maintained by a scheduler in order to allow multiple paths of execution through a piece of code, or in order to allow the CPU(s) to be shared between multiple running programs.

A "virtual device driver" (VxD) is a special type of Windows® driver that allows Windows® to perform functions that cannot be done by applications communicating with Windows in the normal manner. VxDs run at the most privileged CPU mode (ring 0) and allow low-level interaction with the hardware and internal Windows® functions, such as memory management. Consequently, poorly-written VxDs can cause the operating system to crash.

The "Windows driver model" (WDM) is a device driver architecture from Microsoft that is a subset of the Windows NT® driver model. WDM enables a single driver to run on both Windows® 98 and Windows NT®. Hardware vendors can use WDM to write one driver for their hardware that will work on both operating systems.

Figure 1:
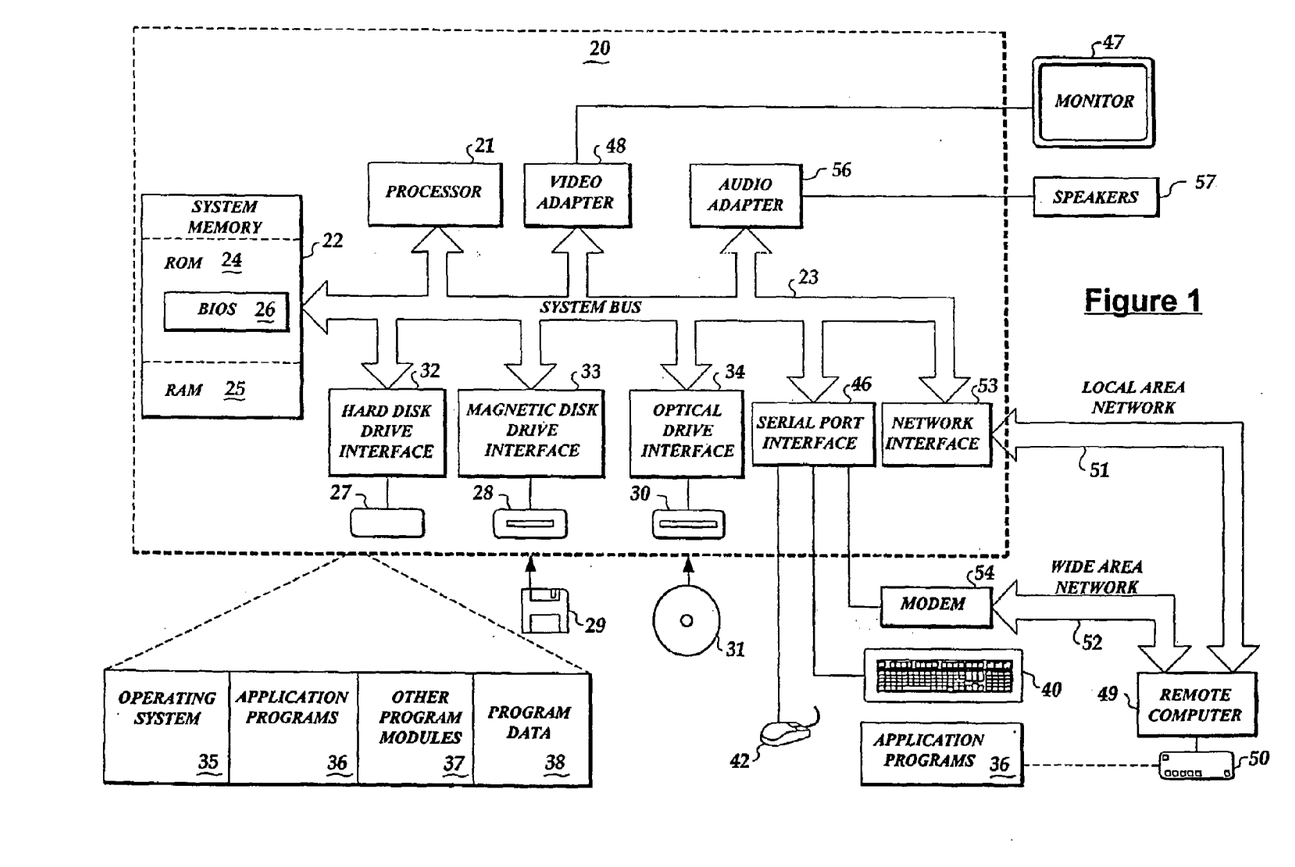
FIG. 1 is a block diagram of a general-purpose computer system capable of being used in conjunction with the present invention.

Now therefore, in accordance with the present invention, an operating system executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules or components 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

Figure 2:
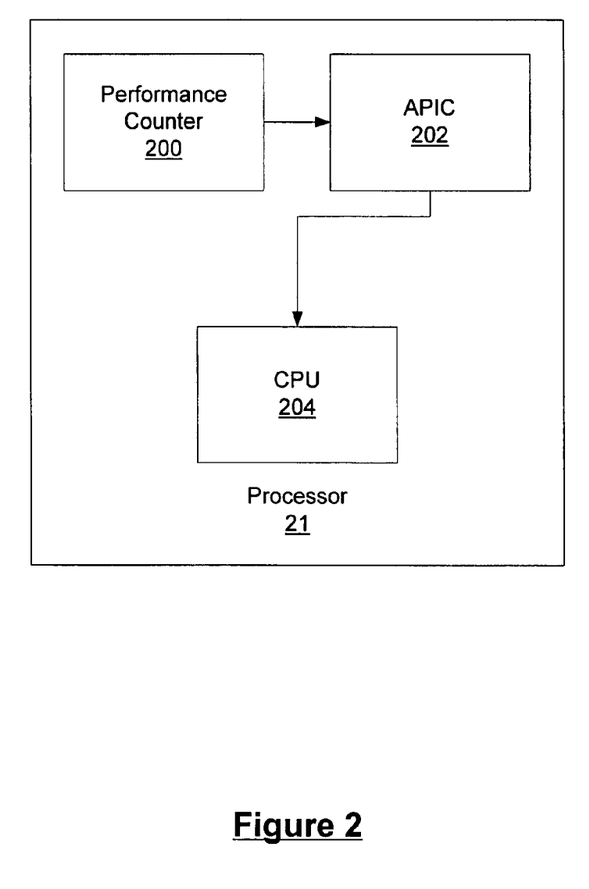
FIG. 2 is a block diagram of the performance counter, APIC and CPU located within the microprocessor of FIG. 1.

The personal computer 20 may operate in a networked environment using logical connections to one or more remote computers, such as remote computer 49 or any of the computers shown in FIG. 2. Each remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. As depicted in FIG. 1, the remote computer 49 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The next figure, FIG. 2, provides a partial overview of an exemplary processor 21 capable of being used in conjunction with the present invention. Preferably, processor 21 is one of the following chips available from Intel Corporation: the Pentium II 4 GB MMX, Pentium III 4 GB MMX KNI, Celeron 4 GB MMX, Xeon PII 64 GB MMX, or Xeon PIII 64 GB MMX KNI. As shown in FIG. 2, the processor 21 preferably includes at least one local performance counter 200 and at least one local APIC 202. It should be noted that the performance counter 200 could be any type of programmable or re-settable counter that counted any type of instruction (e.g. halted, unhalted, etc.) or cycle (e.g. clock cycle, machine cycle, etc.). Similarly, the performance counter 200 could simply be any type of programmable or re-settable timer, or any other type of device capable of determining when to allocate CPU resources. It should also be noted that the APIC 202 could be any type of interrupt controller, such as a PIC, a traditional APIC, an APIC embedded within the processor (as shown) or an OpenPIC.

Further, the performance counter 200 and APIC 202 need not be local or located within the processor 21. However, using a performance counter 200 and an APIC 202 locally located within the processor 21 will decrease the distance between the performance counter 200, APIC 202 and CPU 204. This will reduce the signal propagation delay and thus, will improve the performance and timing characteristics of the present invention. Consequently, the above-reference Pentium processors are preferable, because a performance counter 200, an APIC 202 and a CPU 204 are embedded inside the processor 21. The basic architecture, instruction set reference and system programming guide for these Pentium processors are publicly available and fully set forth in *The Intel Architecture Software Developer's Manual*, Volumes 1–3, Order Numbers 243190-92. Although inclusion of this manual is not necessary to enable a person of ordinary skill in the art to make and use this invention, the manual is nonetheless incorporated herein by reference—in its entirety—in order to provide the reader with background technical information regarding the performance counter 200, APIC 202 and CPU 204 of the preferred processor.

Figure 3:
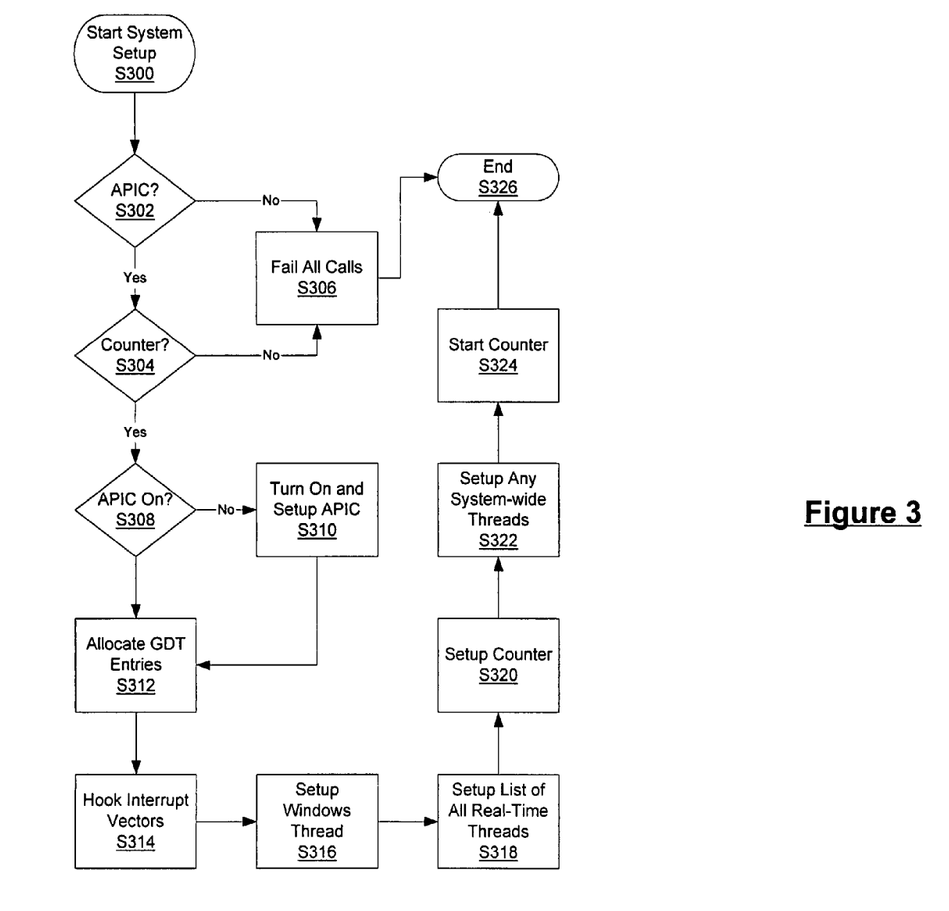
FIG. 3 is a flow chart illustrating an exemplary process of setting up the microprocessor and operating system used in the present invention.

FIG. 3 shows a flow chart of an exemplary process of setting up the processor 21 and operating system used in the present invention. After the process is started S300, the process first determines whether an interrupt controller, PIC, or APIC is available and capable of being used in accordance with the present invention S302. If, for example, an APIC 202 is available—as it is with the above-referenced Pentium processors, then the process determines whether a counter, timer or other usable device is also available S304. If an APIC S302 or a counter S304 is not available, then the process will fail all calls to it S306—irrespective of whether the process continues to load itself into memory.

If an APIC 202 and counter 200 are available and capable of being used S302-04, then the process examines the interrupt controller to determine whether the controller is "on" S308. If the controller is not "on," then the process will turn "on" and setup the APIC S310. As part of this setup, the APIC 202 will be preferably programmed to: (1) issue a NMI to the CPU 202 every time a NMI is received from the counter 200, and (2) instruct the CPU 202 to look to the appropriate entry in the IDT upon receipt of a NMI from the APIC 202.

After the process determines that the APIC is "on" S308, or turns the APIC "on" and sets it up, all GDT entries for the applicable shared data are then updated S312. The applicable interrupt vectors are then "hooked" S314. In other words, the old entry in the IDT is stored, and the address for the real-time-thread-switching process is input into the entry in the IDT S314. A real-time thread is then created for the Windows® kernel S316, an example of which is discussed below in connection with FIG. 5. Preferably, this thread only contains state information regarding the stack, processor and floating point unit. Further, this thread should preferably not be able to make any system calls during execution. A list of all real-time threads is then set up S318, and the real-time thread for the Windows® kernel is added to the list.

The performance counter 200 is next set up for the first time S320. As part of this setup, the process will preferably program the counter 200 to issue a NMI to the APIC 202 every time the counter turns over (i.e. reaches zero (0)), thereby instructing the CPU to switch execution to a new thread in accordance with the invention. Further, the counter 200 will be programmed to count machine cycles, unhalted cycles, executed instructions or some other event. Lastly, the process will also initialize the counter 200 by assigning an initial value to the counter to trigger the first NMI. For example, if the process would like the next thread to be executed 3 cycles in the future, then the counter 200 would be assigned the hexadecimal number 0xFFFFFFFD (i.e. 0x00000000 minus 3=0xFFFFFFFD). If the next thread was to be executed in 6 cycles, then the counter 200 would be assigned the hexadecimal number 0xFFFFFFFA (i.e. 0x00000000 minus 6=0xFFFFFFFA), and so on.

If there are any system-wide threads to be executed, the process next sets these up S3222. An example of a system-wide thread that might be used is a thread that monitors overhead for the inventive process. However, other system-wide threads could also be implemented if desired. Lastly, the performance counter 200 is started S324 and the system-setup process terminates S326.

Figure 4:
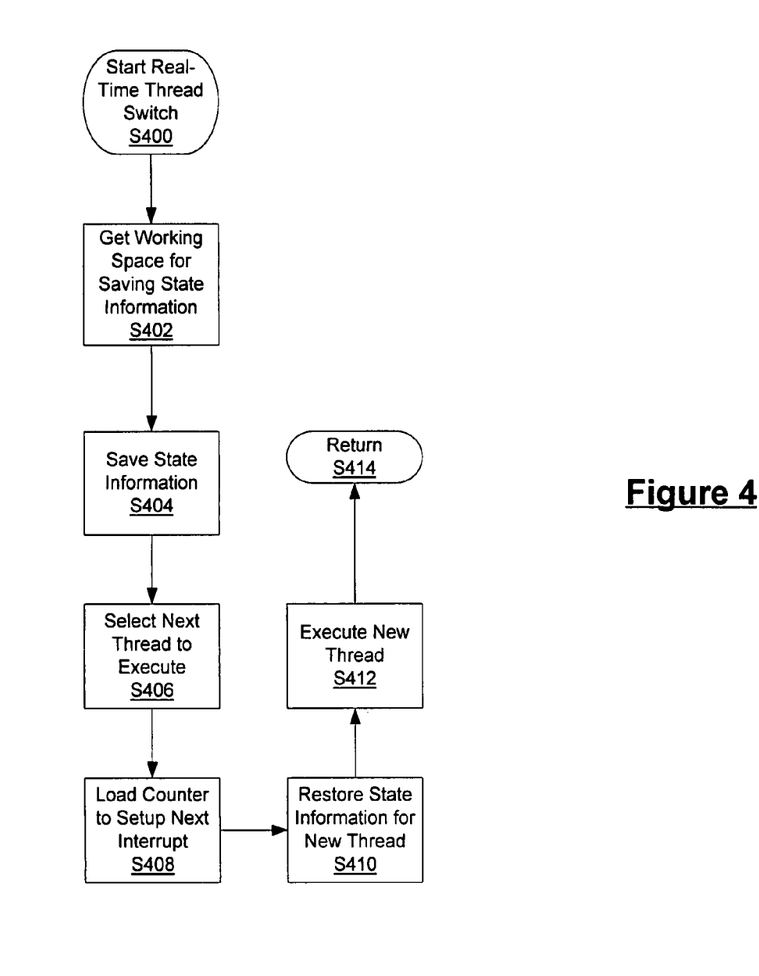
FIG. 4 is a flow chart depicting an exemplary process for switching execution from one real-time thread to another.

FIG. 4 depicts a flow chart of an exemplary process for switching execution from one real-time thread to another after the system-setup process has terminated S326. The address in memory for the start-real-time-thread-switch process is stored in the IDT as described above. Whenever the counter 200 reaches zero, the counter issues a NMI to the APIC 202. The APIC 202 routes the NMI to the CPU 204. The CPU 204 consults the IDT in order to determine the memory address for the NMI, and thus starts execution of the start-real-time-thread-switch process S400.

On execution, the process first obtains working space for saving all applicable state information S402. The state information could include information regarding any one or more of the following: the processor state, the floating point unit state, the stack and/or the counter 200. The state information is then saved in the working space S404, and the next thread (i.e. new thread) to be executed is selected S406. Of course, any scheduling algorithm could be used to select the next thread for execution. The counter 200 is next assigned a value to setup the next interrupt S408. The process restores the previously stored state information pertaining to the new thread to be executed S410. The CPU 204 is next setup to execute the new thread S412. The start-real-time-thread-switch process then returns control to the CPU 204 for execution of the new thread S414.

Figure 5:
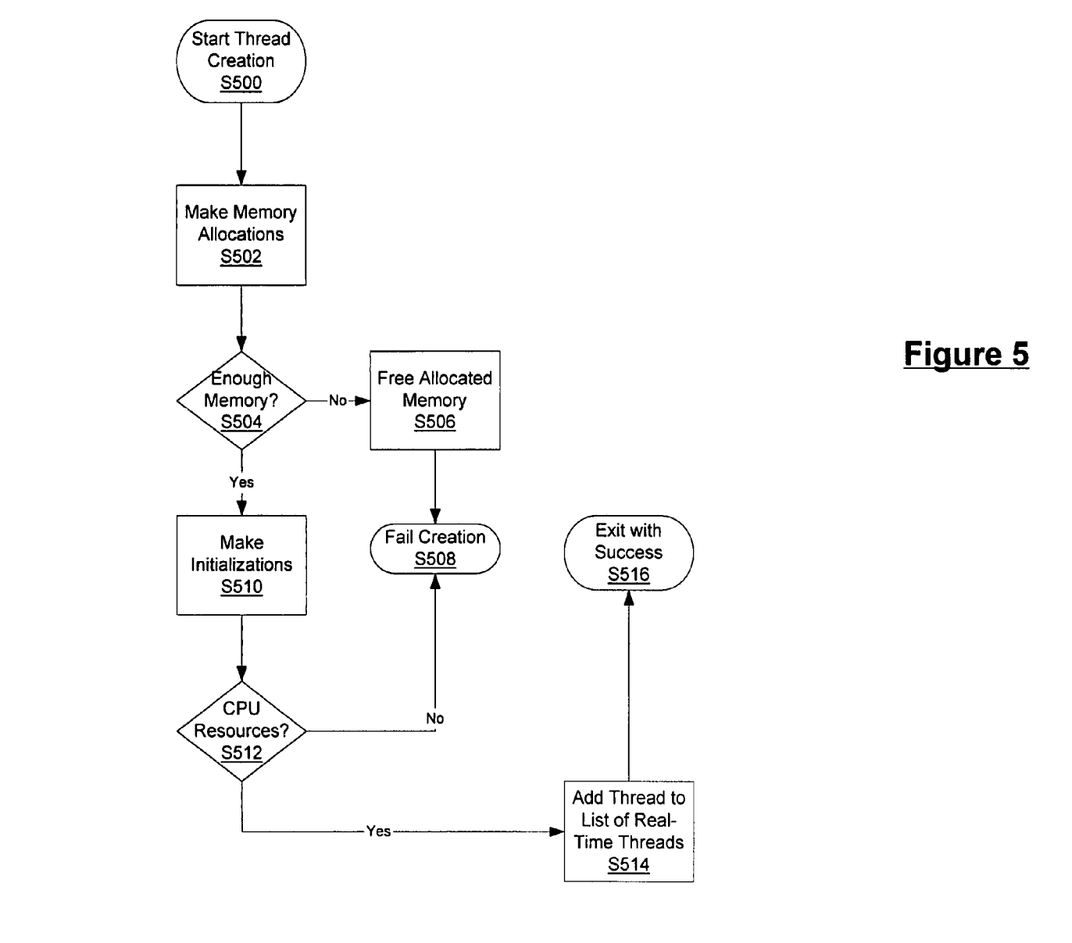
FIG. 5 is a flow chart showing an exemplary process of creating new real-time threads.

FIG. 5 illustrates a flow chart of an exemplary process of creating new real-time threads. Whenever a new real-time thread is to be created, such as in S316, a thread-creation process is called S500. The process first makes a locked memory (i.e. non-paged pool) allocation for all applicable space, such as: stack space, state space and floating point unit space S502. If the process was unable to allocate sufficient memory, then all allocated memory is freed S506 and the thread-creation process is failed S508.

However, if the process is able to allocate sufficient memory for the applicable space, the process makes all applicable initializations S510 including, but not limited to one or more of the following: the stack, the processor state, and the floating state. If sufficient CPU resources are not available to service the real-time thread, then the thread-creation process is also failed S508. Otherwise, if sufficient CPU resources are available to service the real-time thread S512, then the thread is added to the list of real-time threads S514 and the thread-creation process exits with success S516.

It should also be noted that when a real-time thread terminates before expiration of its CPU resources, and thus, before issuance of the applicable NMIs, the real-time thread should preferably yield the balance of its CPU resources. This is preferably accomplished by writing a command directly in the command register for the APIC 202 that instructs the APIC 202 to issue a NMI (i.e. a hardware interrupt) to the CPU 204. Alternatively, this could be accomplished by assigning a new hexadecimal value to the counter 200. For example, assigning a value of 0xFFFFFFFF would trigger a thread switch in one cycle or, assigning a value of 0x00000000 might trigger an immediate switch by causing the counter 200 and APIC 202 to each issue a NMI. However, this approach overwrites the value in the performance counter 200. Still another approach would be to issue a software NMI to the CPU. However, the timing on software interrupts is different from hardware interrupts. Further, since this NMI would be a software interrupt, a different hardware NMI could interrupt the ISR.

In sum, the present invention overcomes the limitations and problems of the prior art by preferably using a performance counter to count unhalted cycles or instructions executed on the CPU. After a determined number of cycles or instructions transpire, the performance counter issues a non-maskable interrupt (NMI) to a programmable interrupt controller (PIC), such as an APIC on an Intel x86 CPU or an OpenPIC on a Cyrix or AMD CPU. Issuance of the NMI triggers execution of the scheduler, and thus, switches thread execution on a real-time basis. Thus, the present invention provides improved methods and computer-executable components for facilitating real-time scheduling of CPU resources.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer-readable medium having computer-executable instructions for performing real-time execution-thread switching comprising:
   issuing a first non-maskable interrupt from a counter to an interrupt controller when the counter turns over;
   in response to receiving the first non-maskable interrupt, issuing a second non-maskable interrupt from the interrupt controller to a central processing unit;
   in an interrupt service routine that services the second non-maskable interrupt,
       saving a first execution thread's current state information, wherein the first execution thread is an application-level-code execution thread that does not execute in a most-privileged CPU mode, and wherein the first execution thread's current state information includes stack data, processor data, and floating point-unit data;
       setting the counter to specify when the counter will turn over again;
       restoring previously stored state information pertaining to a second execution thread, wherein the second execution thread is an application-level-code execution thread that does not execute in a most-privileged CPU mode, and wherein the previously stored state information pertaining to the second execution thread includes stack data, processor data, and floating-point-unit data; and
   after execution of the interrupt service routine has finished, executing the second execution thread such that the interrupt service routine that services the second non-maskable interrupt minimizes overhead associated with switching thread execution from the first thread to the second thread.

2. The computer-readable medium of claim 1, wherein the counter is an advanced programmable interrupt controller.

3. The computer-readable medium of claim 1, wherein the second execution thread is executed after interrupts, which were pending wherein the interrupt service routine finished, have been executed and after deferred procedure calls, which were pending when the interrupt service routine finished executing, have been executed.

4. A method for performing real-time execution-thread switching comprising:
   issuing a first non-maskable interrupt from a counter to an interrupt controller when the counter turns over;
   in response to receiving the first non-maskable interrupt, issuing a second non-maskable interrupt from the interrupt controller to a central processing unit;
   in an interrupt service routine that services the second non-maskable interrupt,
      saving a first execution thread's current state information, wherein the first execution thread is an application-level-code execution thread that does not execute in a most-privileged CPU mode, and wherein the first execution thread's current state information includes stack data, processor data, and floating point-unit data;
      setting the counter to specify when the counter will turn over again;
      restoring previously stored state information pertaining to a second execution thread, wherein the second execution thread is an application-level-code execution thread that does not execute in a most-privileged CPU mode, and wherein the previously stored state information pertaining to the second execution thread includes stack data, processor data, and floating-point-unit data; and
   after execution of the interrupt service routine has finished, executing the second execution thread such that the interrupt service routine that services the second non-maskable interrupt minimizes overhead associated with switching thread execution from the first thread to the second thread.

5. The method of claim 4, wherein the counter is an advanced programmable interrupt controller.

6. The method of claim 4, wherein the second execution thread is executed after interrupts, which were pending when the interrupt service routine finished, have been executed and after deferred procedure calls, which were pending when the interrupt service routine finished executing, have been executed.

7. A system for performing real-time execution-thread switching comprising:
   means for issuing a first non-maskable interrupt from a counter to an interrupt controller when the counter turns over;
   means for issuing, in response to receiving the first non-maskable interrupt, a second non-maskable interrupt from the interrupt controller to a central processing unit;
   interrupt-service-routine means for servicing the second non-maskable interrupt, including
      means for saving a first execution thread's current state information, wherein the first execution thread is an application-level-code execution thread that does not execute in a most-privileged CPU mode, and wherein the first execution thread's current state information includes stack data, processor data, and floating point-unit data;
      means for setting the counter to specify when the counter will turn over again;
      means for restoring previously stored state information pertaining to a second execution thread, wherein the second execution thread is an application-level-code execution thread that does not execute in a most-privileged CPU mode, and wherein the previously stored state information pertaining to the second execution thread includes stack data, processor data, and floating-point-unit data; and
   means for executing the second execution thread, after the interrupt-service-routine means services the second non-maskable interrupt, such that the interrupt-service-routine means minimizes overhead associated with switching thread execution from the first thread to the second thread.

8. The system of claim 7, wherein the counter is an advanced programmable interrupt controller.

9. The system of claim 7, wherein the second execution thread is executed after interrupts, which were pending when the interrupt-service-routine means finished servicing the second non-maskable interrupt, have been executed and after deferred procedure calls, which were pending when the interrupt-service-routine means finished servicing the second non-maskable interrupt, have been executed.

* * * * *

UNITED STATES PATENT AND TRADEMARK OFFICE
CERTIFICATE OF CORRECTION

PATENT NO. : 6,990,669 B2
APPLICATION NO. : 09/531397
DATED : January 24, 2006
INVENTOR(S) : Joseph C. Ballantyne

It is certified that error appears in the above-identified patent and that said Letters Patent is hereby corrected as shown below:

In column 4, line(s) 62–65, delete "The number of programs that can be effectively multitasked depends on the type of multitasking performed (preemptive vs cooperative), CPU speed and memory and disk capacity." and
insert -- The number of programs that can be effectively multitasked depends on the type of multitasking performed (preemptive vs cooperative), CPU speed and memory and disk capacity. -- therefor on line 61 after "same time.".

In column 11, line 3, in Claim 3, delete "wherein" and insert -- when --, therefor.

Signed and Sealed this

Eleventh Day of August, 2009

David J. Kappos
*Director of the United States Patent and Trademark Office*